United States Patent [19]
Lowther

[11] 4,094,652
[45] * June 13, 1978

[54] ELECTRODESORPTION SYSTEM FOR REGENERATING A DIELECTRIC ADSORBENT BED

[75] Inventor: Frank Eugene Lowther, Buffalo, N.Y.
[73] Assignee: W. R. Grace & Co., New York, N.Y.
[*] Notice: The portion of the term of this patent subsequent to Jul. 26, 1994, has been disclaimed.
[21] Appl. No.: 768,763
[22] Filed: Feb. 15, 1977

Related U.S. Application Data

[63] Continuation-in-part of Ser. No. 625,237, Oct. 23, 1975, abandoned, which is a continuation-in-part of Ser. No. 527,832, Nov. 27, 1974, abandoned.

[51] Int. Cl.² .......................................... B01D 53/04
[52] U.S. Cl. .................................. 55/33; 55/75; 55/208
[58] Field of Search .............. 55/29, 31, 33, 34, 75, 55/159, 179, 208, 389, 18; 204/129, 165, 130, 195, 144.5

[56] References Cited

U.S. PATENT DOCUMENTS

| | | |
|---|---|---|
| 3,188,283 | 6/1965 | Cole ................................. 204/195 X |
| 3,193,985 | 7/1965 | Siggelin ............................... 55/33 |
| 3,594,983 | 7/1971 | Yearout ............................... 55/33 |
| 3,734,293 | 5/1973 | Biskis .............................. 55/208 X |
| 4,038,050 | 7/1977 | Lowther ............................... 55/18 |

Primary Examiner—John Adee
Attorney, Agent, or Firm—Arthur P. Savage; W. W. McDowell, Jr.

[57] ABSTRACT

A drying system wherein fluid is contacted with a bed of dielectric absorbent particles, preferably zeolite molecular sieve particles, to sorb an adsorbable component such as water, from the fluid. The improved system includes means for reactivating the moisture saturated bed by directly applying to the zeolite particles a high voltage electrical field having sufficient potential gradient (e.g., 0.2 to 500 Kv/cm) to separate substantially all of the sorbed moisture as molecular water. Direct current or low frequency $(0-10^3 H_z)$ is employed. In the preferred embodiments the molecular sieve bed comprises synthetic crystalline metal alumino silicate zeolite particles such as powder having an average particle size of about 1 $\mu$ to 10 $\mu$ or larger 4 to 12 mesh bonded particles (e.g. 1000 $\mu$ to 5000 $\mu$). The electro-desorption process is advantageous in that the amount of time and energy consumed in regenerating the bed is less than that required for conventional regeneration procedures.

29 Claims, 6 Drawing Figures

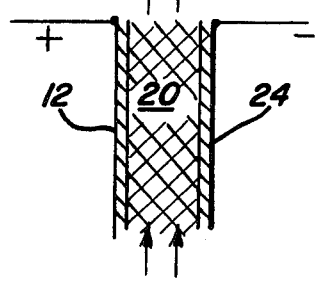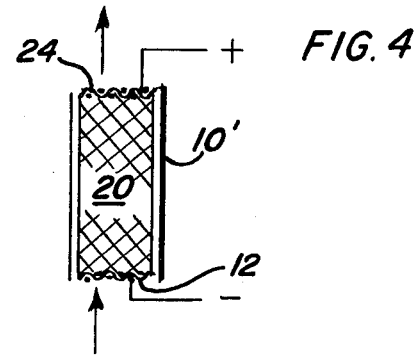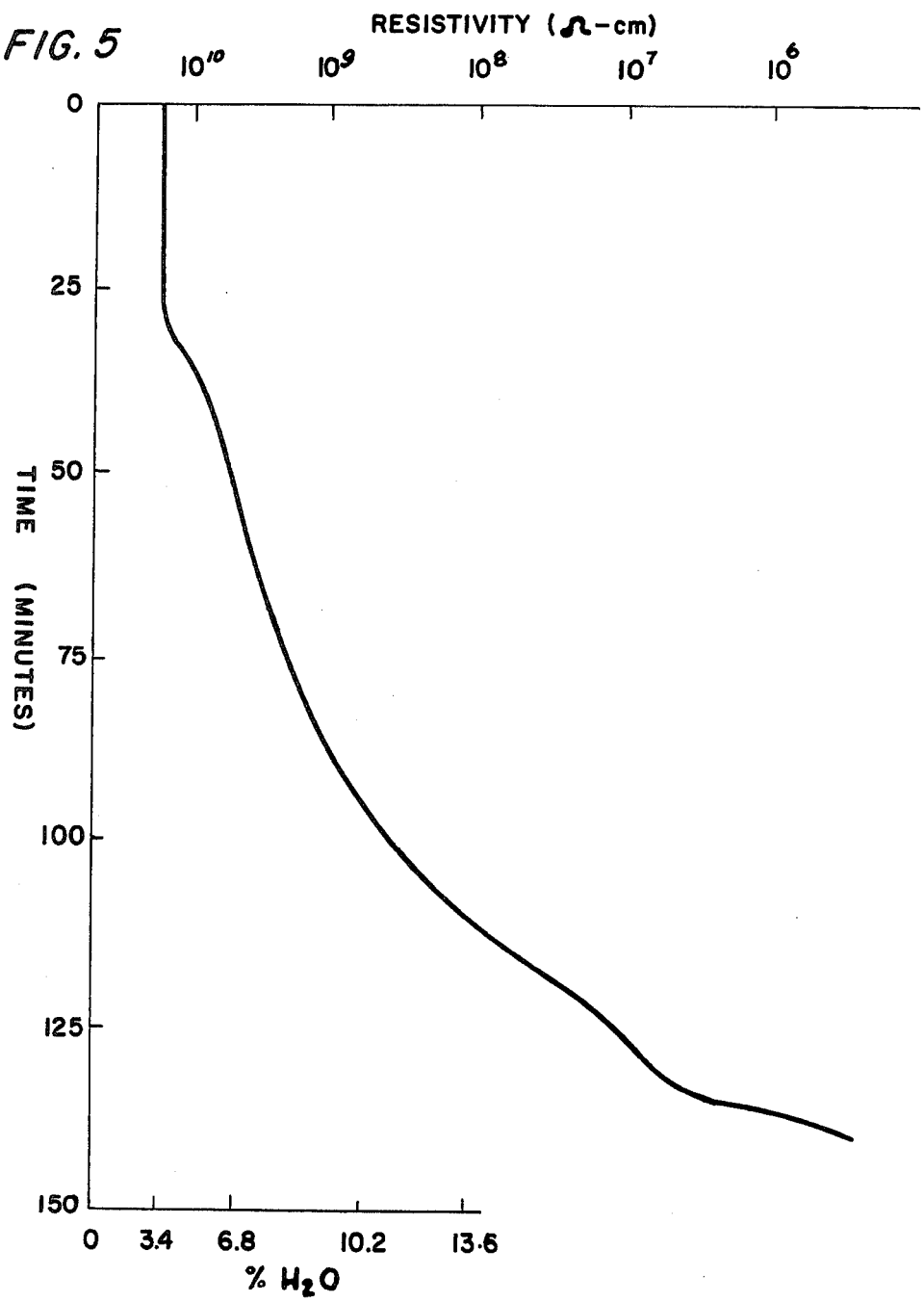

ELECTRODESORPTION SYSTEM FOR REGENERATING A DIELECTRIC ADSORBENT BED

This application is a continuation-in-part of application Ser. No. 625,237 filed Oct. 23, 1975 which is a continuation-in-part of application Ser. No. 527, 832, filed Nov. 27, 1974, both abandoned.

BACKGROUND OF THE INVENTION

This invention relates to molecular sieve drying systems. In particular, it relates to methods and apparatus for removing moisture from fluid streams and for regenerating or reactivating moisture-laden zeolite particles of the alkali metal aluminosilicate type. Molecular sieves made from natural or synthetic crystalline alkali-metal alumino-silicates of the zeolite type have been found useful for removing selected components from fluid streams. Drying of fluids such as air, petroleum feedstocks or industrial gases has provided a substantial use for molecular sieve.

Gases can be dried to a water content of a few parts per million. In many systems designed to condition feed to cryogenic plants, the gas must be dried to a fraction of a part per million — low enough to make deriming of heat exchangers a very rare necessity, even when the gas is taken all the way to the liquid phase. This superdrying can be accomplished even when the feed gas is at high temperature because the dewpoints of molecular sieve dehydration are not a function of inlet temperature, and because these unique adsorbents maintain high capacity even when operating at high temperatures. The ability to handle high temperature feed while producing completely dry gas is a unique characteristic of molecular sieve systems. In addition, the performance of molecular sieves is not affected by the degree of saturation of the feed.

The problem of drying large volumes of fluids at a rapid rate is particularly pressing in the operation of petroleum refineries in which large quantities of hydrocarbon fluids are handled daily. The increase in the yield of product which accompanies such reduction in the water content of the charging stock in many instances more than compensates for the cost of drying the charging stock with chemical drying agents. Although the problem of drying hydrocarbon fluids on a continuous basis is a typical large scale application of the present process because of the large volumes of the hydrocarbon streams utilized in the petroleum industry, the process may be used in many fluid streams (whether normally liquid or gaseous) which are essentially non-reactive with the particular desiccant involved in the process. Thus, moist streams such as air nitrogen, carbon monoxide, carbon dioxide, halogenated hydrocarbon chlorobenzene, and others are nonreactive with appropriate inorganic desiccants and may be utilized as feed stocks for molecular sieve drying processes. The sieves are inert to most process fluids and physically stable in normal bed depths even when wet with water.

The desiccant properties of molecular sieves are carried to higher temperatures than those of other adsorbents. Typical capacity is 16.5% at 95° C and 4% even at 230° C. The amount of water adsorbed has little effect on their drying efficiency up to the "break point" (the point where the vapor pressure increases abruptly). Dewpoints below −75° C, even with gases as high as 100° C, may be realized. Molecular sieves dry gases at high superficial velocities even with low relative humidity feed gases. The velocity usually ranges from 10 to 50 m/min with zeolite agents. For drying purposes, smaller-pore-size molecular sieves (3 A) are often employed to reduce coadsorption of other materials.

Synthetic crystalline alkali-metal alumino-silicates of the faujasite type are described in U.S. Pat. Nos. 2,882,243, 2,882,244, incorporated herein by reference.

PRIOR ART REGENERATION METHODS

The exhausted bed must be regenerated to remove the adsorbate in preparation for the next adsorption step. Normally, the main flow will be switched to a second adsorption tower during this regeneration to provide a continuous operation. In the prior art, regeneration may be accomplished in several ways, the choice depending on technical and economic considerations. Regeneration methods in the past have depended on the same principle — the process conditions surrounding the adsorbent are changed to those corresponding to a very low equilibrium capacity. In general, the greater the difference between the equilibrium capacities of adsorption and regeneration, the more rapid and complete the regeneration.

In typical cyclic systems, the adsorbate is removed from molecular sieve beds by heating and purging with a carrier gas. This regenerates the adsorbent and prepares it for the next adsorption cycle. During regeneration, sufficient heat must be available to raise the temperature of the adsorbent, the adsorbate, and the vessel, plus an additional amount to vaporize the liquid and offset the heat of wetting of the molecular sieve surface. In most practical designs, gas temperatures in excess of the adsorbate's boiling point are used to increase the rate of heat input to the system. When regeneration temperatures are considered, it is the bed temperature (the temperature of the molecular sieve beads) that is critical. Bed temperatures in the 200° to 300° C range are usually employed.

After regeneration, a cooling period reduces the molecular sieve temperature to about 15°–20° C above the temperature of the stream being processed. This is most conveniently done by using the same gas stream as for heating, but with no heat input. The thermal method involves heating to a temperature at which the adsorptive capacity is reduced to a low level so that the adsorbate leaves the molecular sieve surface and is easily removed by a small stream of purge gas. This can be done at operating pressure, or at a reduced pressure.

The "pressure swing" regeneration method similarly depends on reducing the adsorptive capacity by lowering the pressure at essentially constant temperature.

In another method the adsorbate is removed without changing the temperature or pressure, by passage of a fluid (liquid or gas) containing no adsorbable molecules, and in which the adsorbate is soluble or miscible.

Changing the temperature or pressure by passing of a fluid containing a high concentration of an adsorbable molecule can also effect desorption. Because of this high concentration, these molecules are able to displace material previously adsorbed. In the case of liquids, the resulting mixture is then separated, by distillation, into a saleable product of high purity and the regenerating fluid (which is reused).

Regeneration of a wet molecular sieve bed by electrolysis is disclosed in U.S. Pat. No. 3,474,023 by application of a low DC potential to evolve $H_2$ and $O_2$. Also, application of high frequency electrical energy to effect dielectric heating of the bed particles is shown in U.S. Pat. No. 3,359,707.

It is known that the heat of adsorption of water is approximately the same as the heat of vaporization. Prior art regeneration methods consume far in excess of this to remake the adsorbate. In view of the widespread use of molecular sieve adsorption, especially in drying air, hydrocarbon feedstocks and industrial gases, there is a definite need for a sieve regeneration process that is fast and economical.

SUMMARY OF THE INVENTION

It has been discovered that dielectric adsorbent particles, such as zeolite, alumina, silica, or silica-alumina particles can be reactivated by electro-desorption to remove sorbed gas such as water, sulfur dioxide and hydrocarbons. The novel electro-desorption process typically includes the steps of confining molecular sieve particles loaded with sorbed gas between electrodes; applying an electro-desorption potential between the electrodes; and separating desorbed gas from the molecular sieve. In this process the molecular sieve consists essentially of synthetic crystalline alkali metal aluminosilicate of the zeolite type having a particle size of at least about 1 $\mu$. In the preferred embodiments of the invention the bed includes powdered zeolite particles having an average particle size of about 3 $\mu$ to 5 $\mu$ or commercially available 4 to 12 mesh bonded particles of about 1000 $\mu$ to 5000 $\mu$ size. The system also provides means for maintaining a substantially constant regeneration current density through the bed of about 0.01 to 100 $\mu a/cm^2$. This system is particularly useful for regenerating moist zeolites.

Accordingly, it is an object of this invention to provide apparatus and processes for a gas drying system comprising a molecular sieve fluid permeable bed of synthetic crystalline alkalimetal aluminosilicate particles, wherein the aluminosilicate particles consisting essentially of at least one zeolite such as Type A, Type L, Type X, Type Y and mixtures of these zeolite with one another; means for contacting the bed in a drying chamber with a gas to be dried; means for applying a 0 to $10^3 H_z$ electrical field of at least 0.2 Kv/cm across the bed directly through the zeolite particles during regeneration; and means for removing water from the bed during regeneration.

Other objects include providing a drying chamber comprising a closed vessel having spaced electrodes disposed therein at peripheral portions of the bed. Also, the spaced electrodes may be disposed at opposite ends of the bed adjacent to gas inlet and outlet means whereby electrical current flows parallel to the normal gas flow direction. Further objects include providing means for interrupting gas flow through the drying chamber during regeneration, and means for removing water vapor from the drying chamber during regeneration.

These and other objects and features of the invention will be apparent to a skilled scientist by reference to the following description and in the drawing.

THE DRAWING

FIGS. 3 and 4 are schematic representations of alternative embodiments; and

FIG. 5 is a graphic plot of electrical resistivity and moisture content for a molecular sieve bed.

DESCRIPTION

Figure 1:
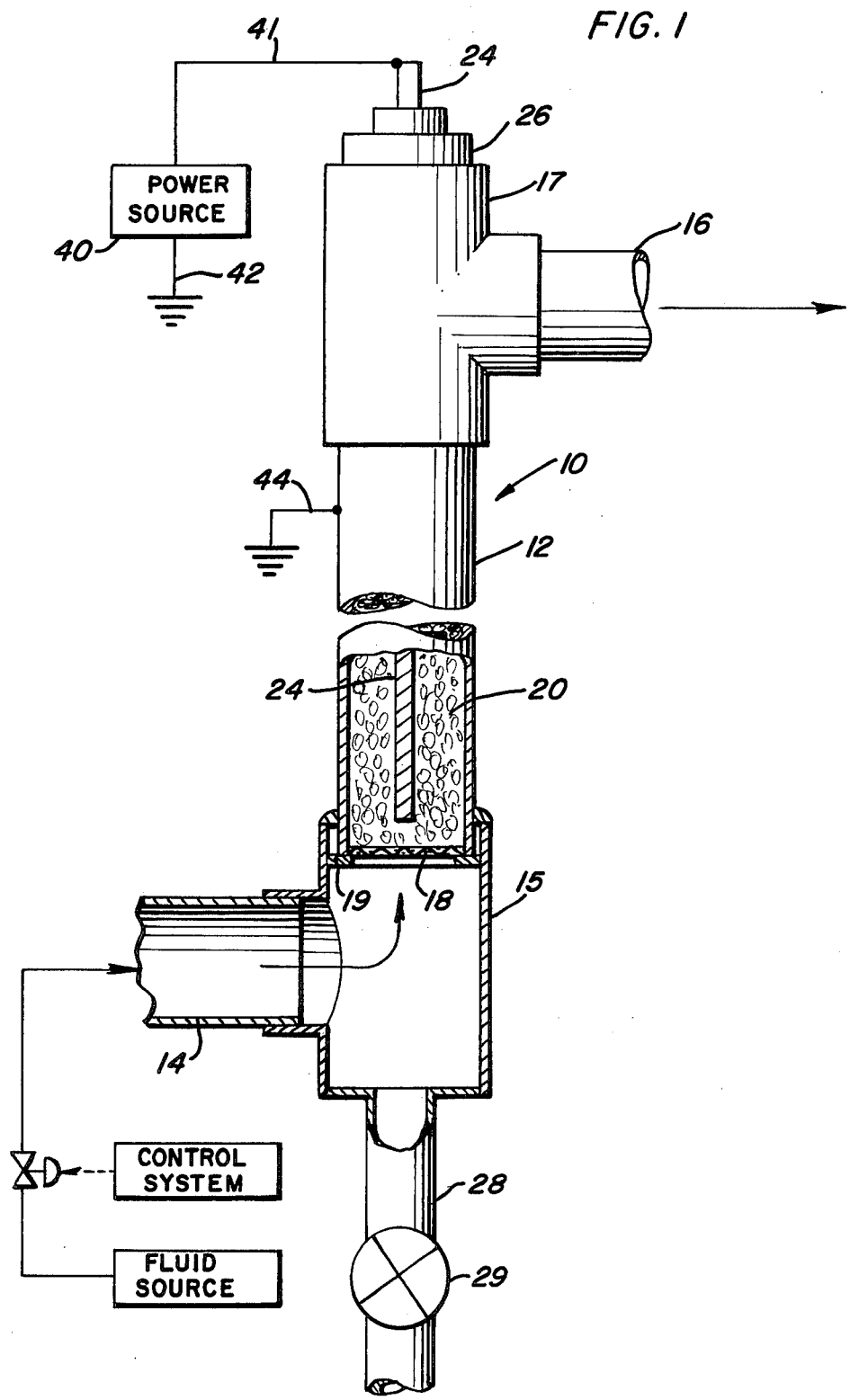
FIG. 1 is a sideview, partially cut away, of typical electro-desorption apparatus, according to the present invention.

The molecular sieve materials consist essentially of crystalline, hydrated metal aluminosilicates with a number of unusual properties. The most important types of molecular sieves are made synthetically, but their structure is similar enough to certain naturally occurring minerals to be classified as zeolites. Although the crystal structures of some of the molecular sieves are quite different (two types, A and X are most important), their significance as commercial adsorbents depends on the fact that in each the crystals contain interconnecting cavities of uniform size, separated by narrower openings, or pores, of equal uniformity. When formed, this crystalline network is full of water, but with moderate heating, the moisture can be driven from the cavities without changing the crystalline structure. This leaves the cavities with their combined surface area and pore volume available for adsorption of water or other materials. The process of evacuation and refilling the cavities may be repeated indefinitely, under favorable conditions.

With molecular sieves close process control is possible because the pores of the crystalline network are uniform rather than of varied dimensions, as is the case with other adsorbents. With this large surface area and pore volume, molecular sieves can make separations of molecules, utilizing pore uniformity, to differentiate on the basis of molecular size and configuration.

Molecular sieves are crystalline, metal aluminosilicates with three dimensional network structures of silica and alumina tetrahedra. This very uniform crystalline structure imparts to the Molecular Sieves properties which make them excellent desiccants, with a high capacity even at elevated temperatures. Some molecular sieves, in addition to this high adsorptive capacity, have the ability to indicate relative humidity by a change in color, which can be utilized to determine the point where reactivation is required.

The crystalline metal alumino-silicates have a three-dimensional interconnecting network structure of silica and alumina tetrahedra. The tetrahedra are formed by four oxygen atoms surrounding a silicon or aluminum atom. Each oxygen has two negative charges and each silicon has four positive charges. This structure permits a sharing arrangement, building tetrahedra uniformly in four directions. The trivalency of aluminum causes the alumina tetrahedron to be negatively charged, requiring an additional cation to balance the system. Thus, the final structure has sodium, potassium, calcium or other cations in the network. These charge balancing cations are the exchangeable ions of the zeolite structure.

In the crystalline structure, up to half of the quadrivalent silicon atoms can be replaced by trivalent aluminum atoms. Zeolites containing different ratios of silicon to aluminum ions are available, as well as different crystal structures containing various cations.

In the most common commercial zeolite, Type A, the tetrahedra are grouped to form a truncated octahedron with a silica or alumina tetrahedron at each point. This structure is known as a sodalite cage.

When sodalite cages are stacked in simple cubic forms, the result is a network of cavities approximately 11.5A in size, accessible through openings on all six sides. These openings are surrounded by eight oxygen ions. One or more exchangeable cations also partially block the face area. In the sodium form, this ring of oxygen ions provides an opening of 4.2A in diameter into the interior of the structure. This crystalline structure is represented chemically by the following formula:

$$Na_{12}[(AlO_2)_{12}(SiO_2)12] \times H_2O$$

The water of hydration which fills the cavities during crystallization is loosely bound and can be removed by moderate heating. The voids formerly occupied by this water can be refilled by adsorbing a variety of gases and liquids. The number of water molecules in the structure (the value of X) can be as great as 27.

The sodium ions which are associated with the aluminum tetrahedra, tend to block the openings, or conversely may assist the passage of slightly oversized molecules by their electrical charge. As a result, this sodium form of the molecular sieve, which is commercially called 4A, can be regarded as having uniform openings of approximately 4A diameter.

Because of their base exchange properties, zeolites can be readily produced with other metals substituting for a portion of the sodium.

Among the synthetic zeolites, two modifications have been found particularly useful in industry. By replacing a large fraction of the sodium with potassium ions, the 3A molecular sieve is formed (with openings of about 3A). Similarly, when calcium ions are used for exchange, the 5A (with approximately 5A openings) is formed.

The crystal structure of the Type X zeolite is built up by arranging the basic sodalite cages in a tetrahedral stacking (diamond structure) with bridging across the six-membered oxygen atom ring. These rings provide opening 9-10A in diameter into the interior of the structure. The overall electrical charge is balanced by positively charged cation(s), as in the Type A structure. The chemical formula that represents the unit cell of Type X molecular sieve in the soda form is shown below:

$$Na_{86}[AlO_2)_{86}(SiO_2)_{106}] \times H_2O$$

As in the case of the Type A crystals, water of hydration can be removed by moderate heating and the voids thus created can be refilled with other liquids or gases. The value of X can be as great as 276.

A prime requisite for any adsorbent is the possession of a large surface area per unit volume. In addition, the surface must be chemically inert and available to the required adsorbate(s). From a purely theoretical point of view, the rate at which molecules may be adsorbed, other factors being equal, will depend on the rate at which they contact the surface of adsorbent particles and the speed with which they diffuse into particles after contact. One or the other of these factors may be controlling in any given situation. One way to speed the mass transfer, in either case, is to reduce the size of the adsorbent particles.

While the synthetic crystals of zeolites are relatively small, e.g., 0.1 $\mu$ to 10 $\mu$, these smaller particles may be bonded or agglomerated into larger shapes. Typical commercial spherical particles have an average bonded particle size of 1000 $\mu$ to 5000 $\mu$ (4 to 12 mesh). Other molecular sieve shapes, such as pellets (1-3 mm diameter), Rashig rings, saddles, etc., are useful for continuous sorption processes. The preferred molecular sieve materials are Type A, L, X and Y zeolites or mixtures of these zeolites, having an average particle size of about 1 $\mu$ to 10 $\mu$ for powder or 1000 $\mu$ to 5000 $\mu$ for bonded particles.

Referring to FIG. 1 of the drawing, a fluid drying apparatus 10 is shown partially cut away. A vertical cylindrical vessel 12 provides a drying chamber. Fluid to be dried is introduced to chamber 12 through fluid inlet means comprising conduit 16 and T-connection 17. Screen 18 is supported at the lower end of vessel 12 by annular ring 19. Screen 18 may be fabricated of metal or suitable material having sufficient strength to support a bed of dielectric absorbent particles 20 such as zeolite molecular sieve particles. A concentric metal electrode 24 is inserted through vessel 12 in contact with particles 20. Electrode 24 is held in fixed position by electrically insulated bushing 26 connected to T-connection 17. Electrode 24 is operatively connected to power source 40 by electrical lead 41. The power source is connected to ground by electrical lead 42.

Vessel 12 may be constructed of an electrically conducted material such as steel to provide a path for direct contact with particulate bed 20. Vessel 20 may be connected to ground by electrical lead 44. Means for draining the vessel 12 may be provided by fluid conduit 27 having valve 28 disposed therein. Conduit 14 is provided with means, such as a control valve, for interrupting inlet fluid flow during regeneration. Discharge outlet 16 can be connected alternatively to a downstream utilization or vented to atmosphere during regeneration to remove sorbate vapor.

The electrodesorption regeneration method may be used with a dry purge gas passing through the bed during regeneration, or a vacuum can be maintained by suitable pressure seals and valving of the system.

FIG. 3 is a schematic representation of an embodiment of the instruction showing parallel solid electrode plates 12-24 in spaced-apart relationship in direct contact with particulate bed 20. Fluid to be dried is passed upwardly through the bed in a direction transverse to current flow through electrodes 12-24.

Another embodiment is shown schematically in FIG. 4 wherein lower screen electrode 12 and upper screen electrode 24 are disposed in dryer 10 which contains a bed of absorbent 20. Fluid flows upwardly in a bed codirectionally with current between electrodes 12 and 24.

The drying cell configuration may be adapted to different process requirements. High gas throughput is obtainable for many processes. Condensation of water vapor or desorbed liquid may require a gravity liquid flow through the particulate bed to a drainport, as shown in FIG. 1. In other systems, the electrodesorbed component is removed only in the vapor phase.

The vessel 12 may be constructed of electrically insulating material such as polyvinyl chloride (PVC), nylon phenolic, acrylic, or ABS resin, glass, glass-lined steel, or wound fiberglass/resin. Where a case electrode is employed, the shell may be metal or metal-lined.

Electrodes may be constructed of sintered metal powder, steel wool, drilled carbon or other foraminous electrically conducting materials. Powdered sieve may be contained by porous metal screen/wool electrode-structures.

The physical state of the bed while drying a fluid need not be the same as during the electrodesorption step. The degree of compaction can vary widely within the operable limits of the system. During regeneration, the zeolite particles should be maintained in a physical state to permit electrical flow from a first electrode to a second electrode through an electrical path from particle to particle. Ordinarily, a void volume of less than 50 vol% is suitable to achieve this condition. Loosely-packed fluid-permeable molecular sieve beds have a macro-porosity or void volume of about 30–40 vol%. It is believed that the flow of electrical current takes place on the particle surface due to mobility of the alkali metal ion in the sorbed water phase.

A comparison of my present method of regeneration with a typical prior art method of regeneration, that is, reactivation, which involves application of heat reveals the efficient use of energy achieved by the present method. For example, the heat of adsorbtion and desorbtion of water as vapor on Type A sodium molecular sieve (NaA) is about 1000 cal/g of $H_2O$ at 20° C. The theoretical heat of desorbtion when water is desorbed in the liquid phase may be calculated as the heat of desorbtion less the heat of vaporization of water that is 1000 less 540 or about 460 cal/g. Accordingly, in my method where water is desorbed from the molecular sieve mostly in the form of molecular water, the minimum heat for regeneration can theoretically approach 460 cal/g. However, in the present method it is observed that the energy required to desorb molecular water from NaA at a reasonable rate is about 1 to 2 times the heat of desorbtion of water as vapor, that is, 1000 to 2000 cal/g $H_2O$.

In contrast, the amount of heat required to desorb water via a conventional heating process as vapor from NaA is equal to the heat of desorbtion, plus the heat of vaporization, plus the heat required to the adsorbent bed and desorbed water vapor to an elevated regeneration temperature at which desorbtion will occur at a reasonable rate.

The following typical example clearly illustrates the saving of energy which is obtained through use of my novel process. Assume the following:

Heat capacity of $H_2O$ vapor: 0.5 cal/g/° C
Heat capacity of $H_2O$ liquid: 1 cal/g/° C
Heat of vaporization of $H_2O$: 540 cal/g
Heat of Adsorbtion of $H_2O$ on NaA: 1000 cal/g
Bulk density of NaA: 0.69 g/cm³
Specific heat of NaA: 0.25 cal/g/° C
Saturation level of $H_2O$ adsorbed on NaA: 0.20 g/g
Regeneration temperature: 230° C A typical adsorbtion column having a diameter of 183 cm and a height of 305 cm and a volume of $8.02 \times 10^6$ cm³ will contain $5.53 \times 10^6$ g of NaA. It is desired to dry in air to a dew point of +10° C or 3000 ppm $H_2O$. It is assumed that to obtain air of this degree of dryness, the bed is placed on an adsorbtion cycle until 5% of its saturated capacity is achieved. Therefore, the amount of $H_2O$ on the bed is equal to:

$$0.05 \times 0.2 \times 5.53 \times 10^6 = 0.6 \times 10^5 g \quad (1)$$

If the heat lost to radiation and convection during a typical 2 to 4 hour regeneration cycle is neglected, the amount of heat required to heat the NaA in the bed to 230° C from 20° is equal to:

$$0.25 c (230-20) \times 5.53 \times 10^6 = 2.9 \times 10^8 cal \quad (2)$$

The heat of desorbtion as water vapor is equal to:

$$1000 \times 0.6 \times 10^5 = 0.6 \times 10^8 cal \quad (3)$$

The heat necessary to raise the temperature of the water vapor to the regeneration temperature is equal to:

$$0.5 \times 0.6 \times 10^5 \times (230-20) = 6.3 \times 10^6 cal \quad (4)$$

The total heat required for conventional regeneration of the bed is the sum of items (2), (3) and (4) above or about (5) $3.6 \times 10^8$ cal.

In contrast to the above, it is found that the heat required to regenerate the same bed using my novel method is equal to between one and two times the heat of adsorbtion as water vapor. Assuming the amount of energy required by my process to be twice the heat of adsorbtion of water vapor, the amount of heat required to regenerate the bed by my process is equal to:

$$2 \times 1000 \times 0.6 \times 10^5 = 1.2 \times 10^8 cal \quad (6)$$

Comparing the value (5) above with (6), the energy saving advantage obtained using my technique may be expressed as follows:

$$(1.2 \times 10^8/3.6 \times 10^8) \times 100 = 33.3\%$$

That is, my novel method utilizes about one-third the heat required to regenerate a molecular sieve drying bed using a standard thermal reactivation technique.

From the above it is seen that from an energy standpoint my present method of adsorbent regeneration is several times as efficient as conventional thermal methods. However, more importantly, it is observed that the time required to achieve regeneration of my method is several times less than that required by thermal means. For example, in the bed described above it is found that about 3 hours are required to achieve satisfactory regeneration at 230° C. Using my technique it is estimated that satisfactory regeneration may be obtained in as little as 3 minutes. These rapid regeneration times permit the use of much smaller beds in that the size of the beds is no longer governed by lengthy reactivation times.

While the mechanism of electro-desorption of wet zeolites is not completely understood, it is believed that the water is first desorbed as a liquid and vaporized from a thin electrolyte film by energy dissipated in the film as heat during application of high voltage. As water is removed from the particles by desorption and evaporation, the bulk resistivity increases.

At a predetermined moisture content, as measured by gas dewpoint, bed conductivity, power consumption or other means, the regeneration step is terminated and the drying cycle is continued.

The electrical parameters can be controlled to obtain optimum utilization of the sieve bed during regeneration. Readily available zeolite particles can withstand in excess of 10 Kv/cm electrical potential. Where the heating rate is high, most of the electrical energy is converted to vaporize water during separation. The amount of electrical energy consumed in regenerating the bed can be slightly greater than the caloric equivalent to the heat of vaporization of water removed from the bed.

To facilitate a uniform rate removal of water, the regeneration step may be carried out under controlled conditions, such as constant current. As sorbed water is removed from the bed, electrical conductivity decreases, which requires an increase in voltage to maintain the desired current. The current density is preferrably maintained at a value of about 0.01 to 100 μa/cm² (microamperes per square centimeter), with optimum performance for most zeolites being obtained under constant current conditions in the range of 1 to 10 μa/cm². Currents as low as 0.001 μa/cm² or as high as 1 a/cm² are feasible. The above current density values are based on uniformly-sized electrodes. It is understood that different maximum and minimum values may be applied to electrically different areas.

For reactivating moisture-loaded metal alumino silicates, the voltage gradient preferably is about 0.2 to 10 Kv/cm, with best results being obtained in the 0.5 to 2 Kv/cm range. However, it is possible to use voltages up to the electrical breakdown of the strongest dielectric zeolite (up to 500 Kv/cm).

The bulk resistivity (p) of zeolite particles is measured in a packed bed having the particles in contact with one another and completely filling the interelectrode space between uniformly shaped parallel conductors. The measured resistance (R) is expressed as $R = pl/A$, where $p$ is the bulk resistivity (ohms-cm²/cm), $l$ is the interelectrode distance (cm) and A is the cell cross-sectional area (cm²).

Current density is a function of bulk resistivity, applied voltage and interelectrode distance, according to the equation:

$I/A = l/p \ (E/l)$. As moisture content of a sieve bed increases, the conductivity increases (p decreases) and more current flows for a given field strength (E/l). In order to maintain constant current during water removal, the electrical field is increased proportionally to conductivity. Thus, when batch reactivation is started, a relatively low voltage gradient is applied and increasing voltage is applied as the water is driven off. The final voltage may be as high as ten times the initial value ($E_f \leq 10 \times E_o$).

The power supply may provide a continuous DC potential, pulsed DC, a square wave or sinusoidal wave of alternating current. Relatively low frequencies of 0 to 60 Hz are preferred; however, the skin conductance phenomenon is efficacious at higher frequencies, for instance 400 Hz or as high as $10^3$Hz. Radio frequencies, such as produced by a HV generator (about $10^7$Hz), cause overheating of the dielectric sieve adsorbent and are not as efficient in energy consumption as the preferred lower frequencies. DC and very low frequency (0–60H$_z$) power supplies are preferred because of the large power factors achieved, as compared to HF generators or other relatively high frequency sources. By employing such electrical supplies, the heating may be confined largely to electrolytic film or surface layer of the absorbent crystallite structure without heating the body of the absorbent itself.

CURRENT CONTROL CIRCUIT

In order to provide a substantially constant current, a saturable core reactor may be employed in a current limiting circuit.

Figure 2:
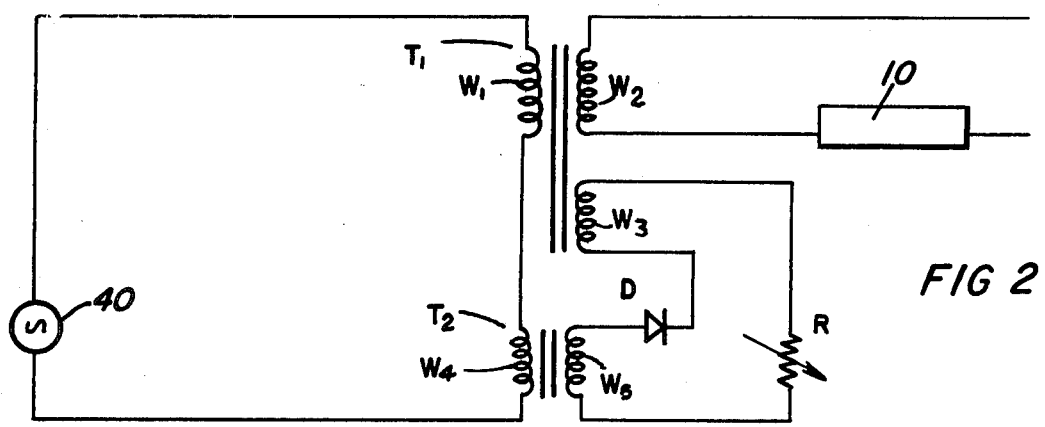
FIG. 2 is a circuit diagram of an electrical control system for an electro-desorption process.

A current control circuit is shown in FIG. 2 of the drawing. Transformer $T_1$ transfers the applied high potential from AC source 40 to the dryer bed 10 via primary winding $W_1$ and secondary winding $W_2$. Current transformer $T_2$ senses the source current via winding $W_4$ and transforms the current to a control loop through winding $W_5$. This current is a direct measure of the current supplied to the sieve bed. This control current is rectified by diode D and applied (DC) to transformer $T_1$ via control winding $W_3$. Variable resistor R permits adjustment of the control current. The higher the DC current the less the winding $W_1$ to $W_2$ coupling and hence the less current applied to the bed 10. As the sieve bed becomes dryer, it demands less current (for fixed voltage), hence the DC becomes less, the core is less saturated and more current (volts) is applied to sieve 10.

A typical operating curve for molecular sieve drying of air is shown in FIG. 5, which is a graphic plot of adsorbed water and resistivity vs. time on stream. These data were obtained using porous screen #18 stainless disc electrodes in a cylindrical acrylic plastic tube with a bed 3.2 cm in diameter and 28 cm long. The particles were 4–5A type X Davison Grade 714 zeolite (8×12 mesh). The air flow through the packed bed was 53 l/min (STP) with an inlet water content of 2500 ppm and outlet content of about 2 ppm. The sieve adsorbs about 6.8% H$_2$O per hour under ambient conditions. Electrical measurements between spaced end electrodes were made using a DC potential of + 18.5 VDC applied with the amode in the downstream position. The sharp upswing in resistivity at the end of the cycle shows the bed approaching moisture saturation, requiring regeneration.

By applying a voltage gradient of about 4000 VDC/cm to the bed, it is regenerated in about 30–60 seconds.

Figure 6:
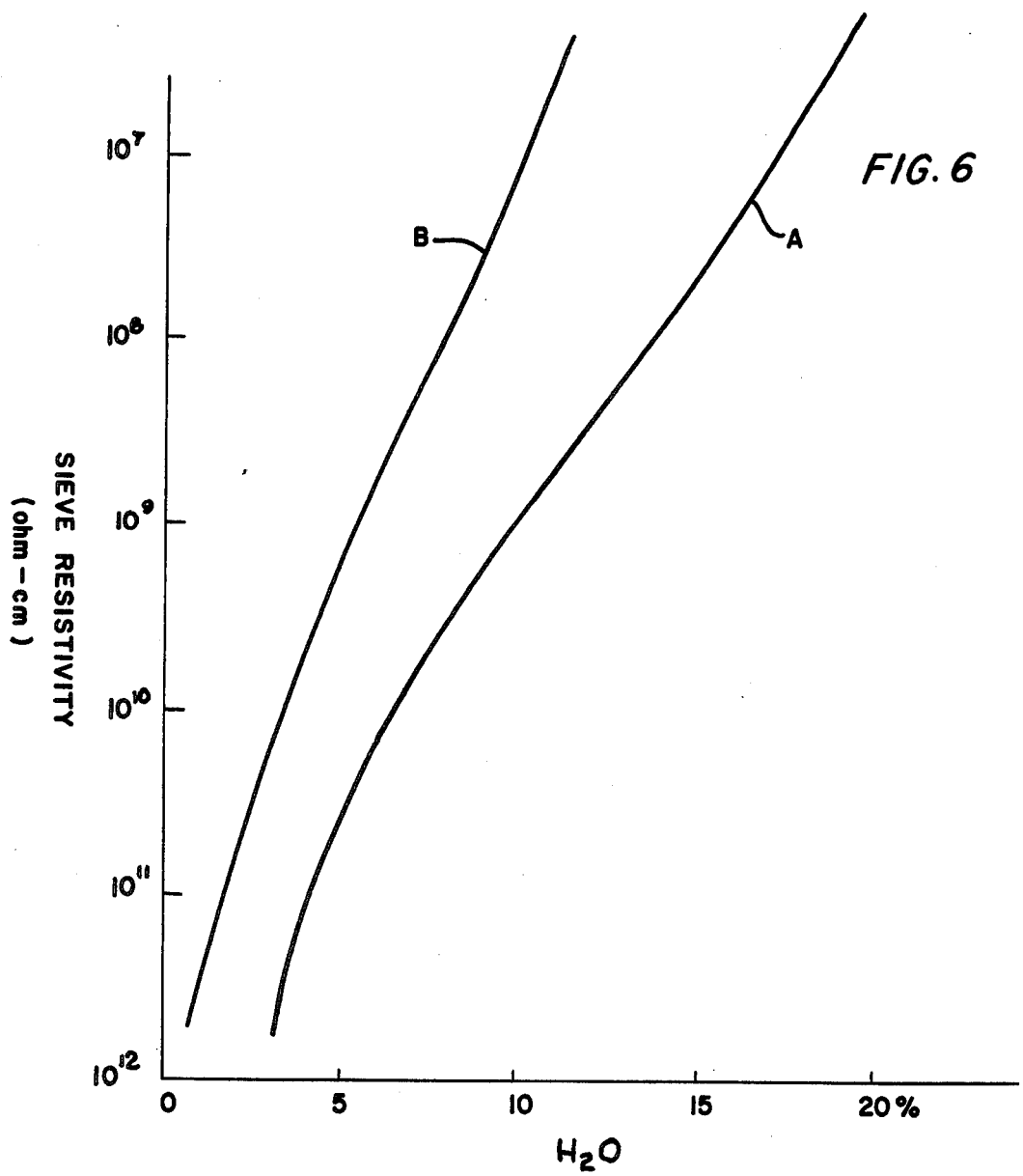
FIG. 6 is a graphic plot of electrical resistivity and moisture content for two different cell configurations.

In FIG. 6 a plot of electrical resistivity vs. moisture content is given for two different cell configurations. Curve A shows the relationship for end-to-end electrodes (FIG. 4) compared to center rod-case electrodes (FIG. 1).

While the invention has been demonstrated by particular examples, there is no intent to limit the inventive concept except as set forth in the following claims.

What is claimed is:

1. A drying system comprising
    a molecular sieve porous bed of synthetic crystalline metal alumino silicate material having an average particle size of about 1 μ to 100 μ, said alumino silicate material consisting essentially of at least one zeolite selected from the group consisting of Type A, Type L, Type X, Type Y and mixtures of said zeolite with one another;
    means for contacting the bed in a drying chamber with a fluid to be dried;
    means for regenerating the bed including means for applying a 0–10³ Hz frequency electrical field of at least 0.2 Kv/cm across the bed directly through the zeolite particles to maintain a current density during regeneration of about 0.01 to 100 microamps/cm²; and
    means for removing water from the bed during regeneration.

2. In a drying system according to claim 1, said drying chamber comprising a closed vessel having spaced electrodes disposed therein at peripheral portions of the bed.

3. In a drying system according to claim 2, said spaced electrodes being disposed at opposite ends of the bed adjacent to gas inlet and outlet means whereby electrical current flows parallel to the normal gas flow direction.

4. In a drying system according to claim 1, means for interrupting gas flow through the drying chamber during regeneration, and means for removing water vapor from the drying chamber during regeneration.

5. In a gas drying system wherein moisture-containing gas is contacted with a bed of zeolite molecular sieve particles to sorb water from the gas, the improvement which comprises:
means for reactivating the moisture containing bed by directly applying to the zeolite particles a high voltage low frequency electrical field having sufficient potential gradient to separate substantially all of the sorbed moisture as molecular water.

6. In a drying system according to claim 5, said bed comprising zeolite particles having an average particle size of about 1 $\mu$ to 100 $\mu$, and further having means for applying a potential gradient of about 0.2 to 10 Kv/cm at a frequency from DC to about $10^3 H_z$.

7. In a drying system according to claim 6, said bed comprising zeolite particles having an average particle size of about 5 $\mu$ to 10 $\mu$, and means for maintaining a substantially constant regeneration current density through the bed of about 0.01 to 100 microamps/cm$^2$.

8. An electro-desorption process for removing sorbed gas from a molecular sieve comprising
confining molecular sieve particles loaded with sorbed gas between electrodes;
applying an electro-desorption potential having a frequency of 0 to 1000 Hz between the electrodes; and
separating desorbed gas from the molecular sieve.

9. The process of claim 8 wherein the molecular sieve consists essentially of synthetic crystalline alkali metal alumino silicate of the faujasite type having a particle size of at least about 1 $\mu$.

10. The process of claim 8 wherein the amount of electrical energy consumed in regenerating the bed is slightly greater than the caloric equivalent to the heat of vaporization the water removed from the bed.

11. The process of claim 8 wherein low frequency AC electrical power is applied between the electrodes.

12. The process of claim 11 wherein the frequency is about 60 Hz.

13. A fluid drying system comprising a vessel having fluid inlet and outlet means;
a bed of dielectric absorbent particles in the vessel;
means for circulating moist fluid in contact with the absorbent;
means for interrupting flow of moist fluid to the vessel;
a plurality of spaced apart electrodes in direct contact with the absorbent particles;
a source of high voltage low frequency electrical power;
a saturable core reactor current limiting device operatively connected to the power source and the electrodes comprising means for controlling a substantially constant current between the electrodes.

14. The system of claim 5 wherein the average particle size of said zeolite is 1 to 5000 microns.

15. The system of claim 14 wherein said means for reactivating the moisture containing bed involves means for applying a potential gradient of 0.2 to 500 Kv/cm, a current density of 0.001 microamps/cm$^2$ to 1 amp/cm$^2$, at frequency of 0–10$^3$Hz.

16. The system of claim 14 wherein said means for reactivating the moisture containing bed includes means for applying a potential gradient of 0.5 to 2 Kv/cm, a current density of 1 to 10 microamps/cm$^2$ at a frequency of 0–60 Hz.

17. The process of claim 8 wherein said molecular sieve has an average particle size of 1 to 5000 microns.

18. The process of claim 8 wherein the electro-desorption potential is applied at a potential gradient of 0.2 to 500 Kv/cm, a current density of 0.001 microamps/cm$^2$ to 1 amp/cm$^2$, and a frequency of 0 to 10$^3$Hz.

19. The process of claim 8 wherein the electro-desorption potential is applied at a potential gradient of 0.5 to 2 Kv/cm, a current density of 1 to 10 microamps/cm$^2$ at a frequency of 0 to 60 Hz.

20. The system of claim 13 wherein said dielectric absorbent particles have a particle size of 1 to 5000 microns.

21. The system of claim 13 wherein said source of electrical power provides a potential gradient of 0.2 to 500 Kv/cm, a current density of 0.001 microamps/cm$^2$ to 1 amp/cm$^2$ at a frequency of 0 to 103 Hz between said electrodes.

22. The system of claim 13 wherein said source of electrical power provides a potential gradient of 0.5 to 2 Kv/cm, a current density of 1 to 10 microamps/cm$^2$ at a frequency of 0–60 Hz between said electrodes.

23. An electro-desorption process for removing sorbed gas from a bed of dielectric absorbent particles comprising:
(a) confining dielectric absorbent particles loaded with sorbed gas between electrodes;
(b) applying an electro-desorption potential having a frequency of 0 to 1000 Hz between the electrodes; and
(c) separating desorbed gas from the dielectric absorbent particles.

24. The process of claim 23 wherein said particles have an average particle size of 1 to 5000 microns.

25. The process of claim 23 wherein said electro-desorption potential is applied with a potential gradient of 0.2 to 500 Kv/am, and a current density of 0.001 microamps/cm$^2$ to 1 amp/cm$^2$.

26. The process of claim 23 wherein said electro-desorption potential is applied with a potential gradient of 0.5 to 2 Kv/cm, and a current density of 1 to 10 microamps/cm$^2$ at a frequency of 0 to 60 Hz.

27. A drying system comprising:
(a) A porous bed of dielectric absorbent particles;
(b) means for contacting the bed in a drying chamber with a fluid to be dried;
(c) means for regenerating the bed including means for applying an electro-desorption potential through said bed, said potential being applied at a frequency of 0 to 1000 Hz/ and
(d) means for removing water from the bed during regeneration.

28. The system of claim 26 wherein said potential is applied with a potential gradient of 0.2 to 500 Kv/cm, and a current density of 0.001 microamps/cm$^2$ to 1 amp/cm$^2$ at a frequency of 0 to 60 Hz.

29. The system of claim 27 wherein said particles have an average particle size of 1 to 5000 microns.

* * * * *